United States Patent
Yamada et al.

(10) Patent No.: US 12,528,435 B2
(45) Date of Patent: Jan. 20, 2026

(54) UNDERRUN PROTECTION AND VEHICLE

(71) Applicant: ISUZU MOTORS LIMITED, Tokyo (JP)

(72) Inventors: Shoji Yamada, Fujisawa (JP); Shunya Saijo, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 366 days.

(21) Appl. No.: 18/115,630

(22) Filed: Feb. 28, 2023

(65) Prior Publication Data
US 2023/0278514 A1    Sep. 7, 2023

(30) Foreign Application Priority Data
Mar. 4, 2022    (JP) .................. 2022-033128

(51) Int. Cl.
*B60R 19/24* (2006.01)
*B60R 19/56* (2006.01)

(52) U.S. Cl.
CPC .............. *B60R 19/56* (2013.01); *B60R 19/24* (2013.01)

(58) Field of Classification Search
CPC .................. B60R 19/56; B60R 19/24
See application file for complete search history.

(56) References Cited

U.S. PATENT DOCUMENTS

| | | | |
|---|---|---|---|
| 12,319,363 B2 * | 6/2025 | Tongue | B62D 35/001 |
| 2022/0324401 A1 * | 10/2022 | Laxman | B60R 19/18 |
| 2023/0406247 A1 * | 12/2023 | Lagin | B60R 19/24 |
| 2024/0042955 A1 * | 2/2024 | Chandrasekaran | B60R 19/56 |

FOREIGN PATENT DOCUMENTS

| | | | |
|---|---|---|---|
| CN | 107074175 A | | 8/2017 |
| CN | 115151450 A | | 10/2022 |
| JP | 2002-225652 A | | 8/2002 |
| JP | 2003276536 A | * | 10/2003 |
| JP | 2004-051065 A | | 2/2004 |
| JP | 2004243831 A | * | 9/2004 |
| JP | 2008-260448 A | | 10/2008 |
| JP | 2009-090796 A | | 4/2009 |
| JP | 2012-171390 A | | 9/2012 |
| JP | 2013177062 A | | 9/2013 |
| JP | 2018154210 A | * | 10/2018 |
| JP | 2021-133747 A | | 9/2021 |
| KR | 970036958 U | | 7/1997 |
| WO | 2021/172302 A1 | | 9/2021 |

* cited by examiner

*Primary Examiner* — Daniel J Colilla
(74) *Attorney, Agent, or Firm* — PROCOPIO, CORY, HARGREAVES & SAVITCH LLP

(57) ABSTRACT

An underrun protection mounted on a vehicle body frame includes: a main body that is hollow in shape and has a longitudinal direction along the width direction of a vehicle; a connecting part connected to the vehicle body frame; a bracket provided farther toward a distal end in the longitudinal direction than the connecting part, inside the main body. The bracket includes a vertical panel disposed along the vertical direction, and a horizontal panel that is connected to a lower end of the vertical panel and is disposed along the longitudinal direction.

10 Claims, 5 Drawing Sheets

B-B-LINE CROSS SECTION

UNDERRUN PROTECTION AND VEHICLE

CROSS-REFERENCE TO RELATED APPLICATIONS

The present application claims priority to Japanese Patent Applications number 2022-033128, filed on Mar. 4, 2022 contents of which are incorporated herein by reference in their entirety.

BACKGROUND OF THE INVENTION

The present disclosure relates to an underrun protection and a vehicle.

A vehicle such as a truck is provided with an underrun protection to inhibit another vehicle from going under the vehicle in the event of collision with another vehicle, for example (see Japanese Unexamined Patent Application Publication No. 2008-260448). The underrun protection is mounted on a vehicle body frame via a connecting part.

When a load is applied to the underrun protection, distal portions that are distal from connecting parts in the longitudinal direction of the underrun protection are deformed rearward and downward. In order to prevent such deformation, there is a measure to increase the panel thickness of the underrun protection, for example, but this leads to an increase in weight of the underrun protection.

BRIEF SUMMARY OF THE INVENTION

The present disclosure has been made in view of these points, and its object is to prevent deformation of an underrun protection while preventing an increase in its weight.

In a first aspect of the present disclosure, there is provided an underrun protection mounted on a vehicle body frame of a vehicle, and the underrun protection includes: a main body that is hollow in shape and has a longitudinal direction along a width direction of the vehicle; a connecting part connected to the vehicle body frame; and a bracket provided farther toward a distal end in the longitudinal direction than the connecting part, inside the main body, wherein the bracket includes: a vertical panel disposed along a vertical direction; and a horizontal panel connected to a lower end of the vertical panel and disposed along the longitudinal direction.

In a second aspect of the present disclosure, there is provided a vehicle including: the above-described underrun protection; and a wheel, wherein the bracket is provided at a position separated outward by a predetermined distance from the wheel in the width direction of the vehicle.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of the Vehicle>

An outline of a vehicle 1 that an underrun protection according to an embodiment of the present disclosure is mounted on will be described with reference to FIG. 1.

Figure 1:
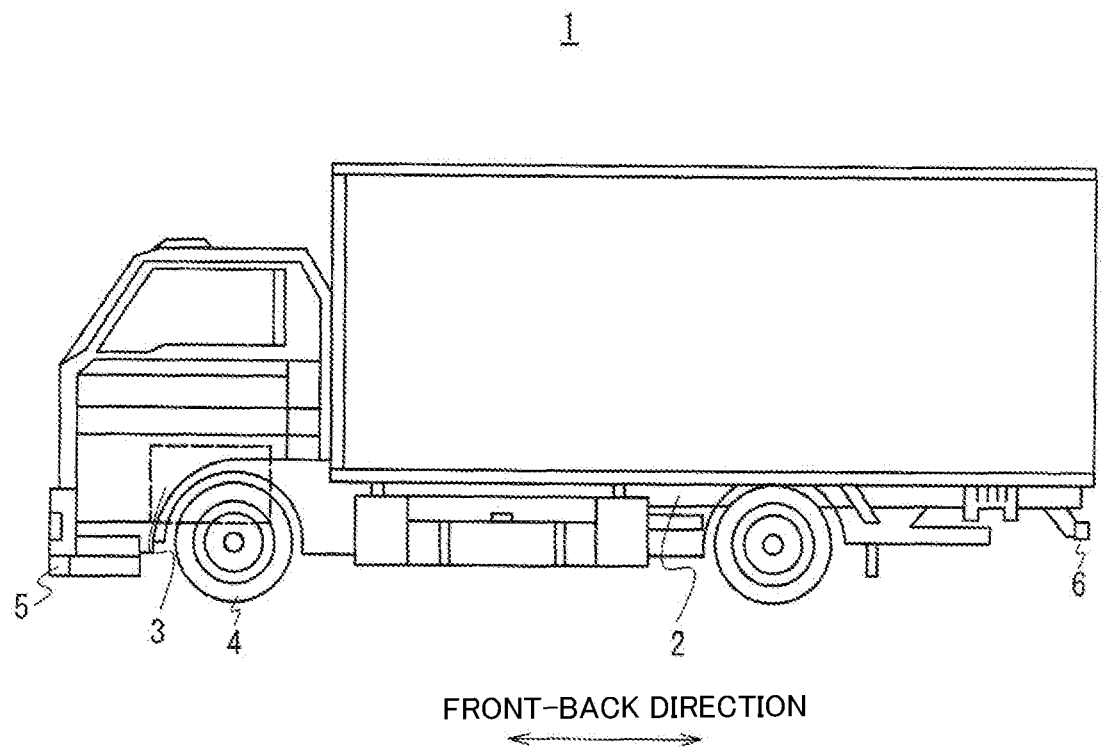
FIG. 1 is a schematic side view of a vehicle 1 according to an embodiment.

FIG. 1 is a schematic side view of a vehicle 1 according to the embodiment. Although the vehicle 1 is a truck here, the vehicle 1 is not limited to this, and may be another vehicle such as a bus. As shown in FIG. 1, the vehicle 1 includes a vehicle body frame 2, a front underrun protection 5, and a rear underrun protection 6.

The vehicle body frame 2 is a frame for supporting the vehicle 1. The vehicle body frame 2 includes a pair of side frames (side frames 2a in FIG. 2) extending in the front-back direction of the vehicle 1, and a cross member (a cross member 2b in FIG. 2) extending in the width direction of the vehicle for connecting the pair of side frames to each other. An engine 3 or the like is mounted on the vehicle body frame 2.

The front underrun protection 5 is an underrun protection mounted on the lower front portion of the vehicle body frame 2. The front underrun protection 5 has a function of inhibiting another vehicle in front of the vehicle 1 from going under the vehicle 1 when the vehicle 1 and the other vehicle collide.

The rear underrun protection 6 is an underrun protection mounted on the lower rear portion of the vehicle body frame 2. The rear underrun protection 6 has a function of inhibiting another vehicle behind the vehicle 1 from going under the vehicle 1 when the vehicle 1 and the other vehicle collide.

<Detailed Configuration of the Underrun Protection>

A detailed configuration of the underrun protection will be described by taking the front underrun protection 5 as an example.

Figure 2:
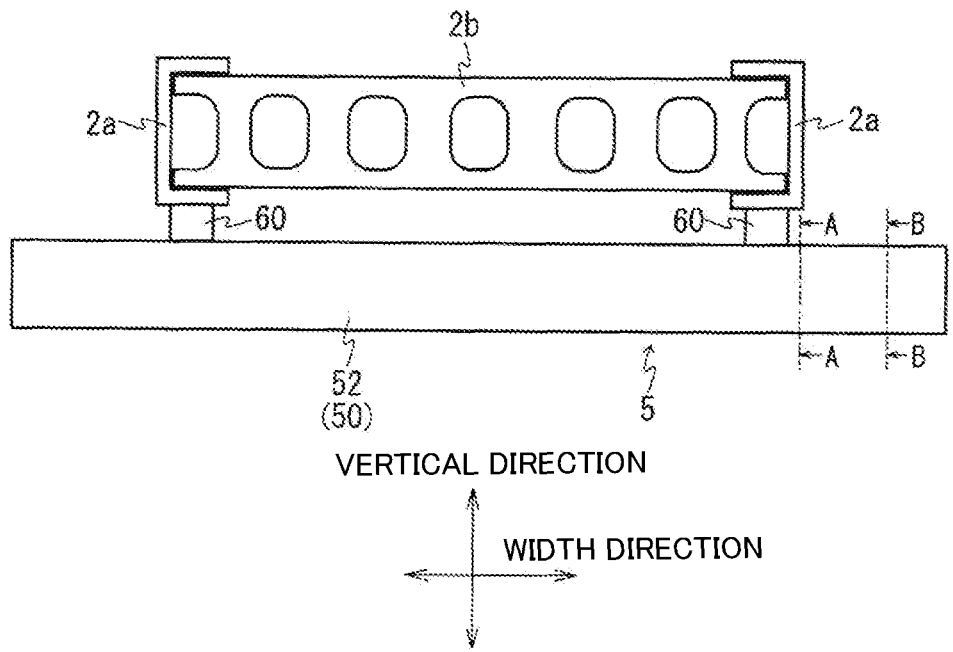
FIG. 2 is a schematic view for explaining a configuration of a front underrun protection 5.
Figure 3:
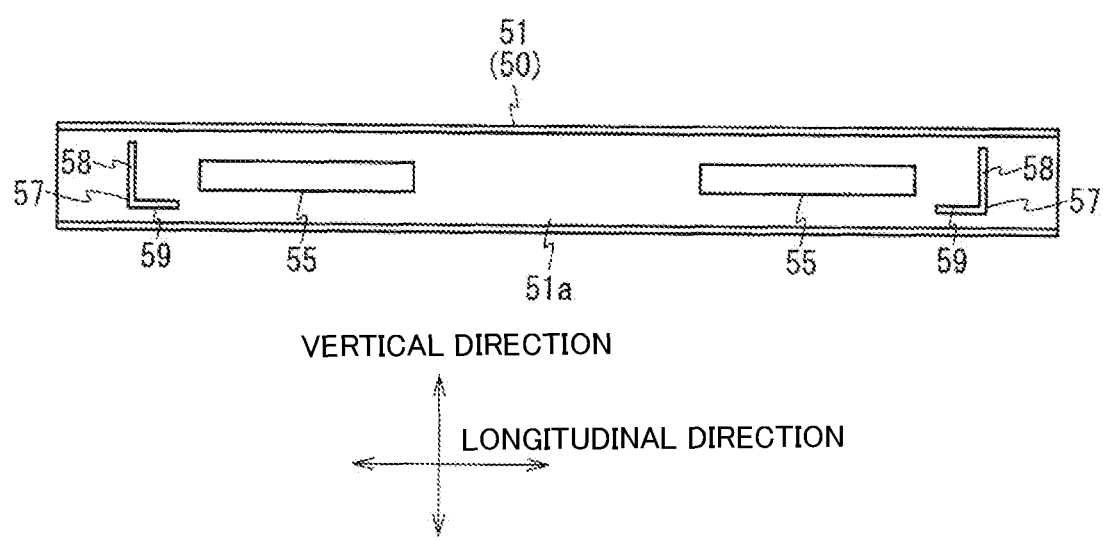
FIG. 3 is a schematic view for explaining an internal configuration of a main body 50.
Figure 4:
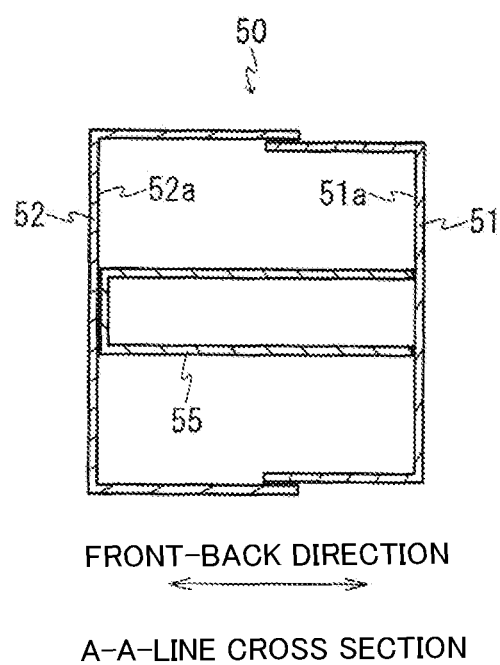
FIG. 4 is a cross-sectional view taken along the line A-A of FIG. 2.
Figure 5:
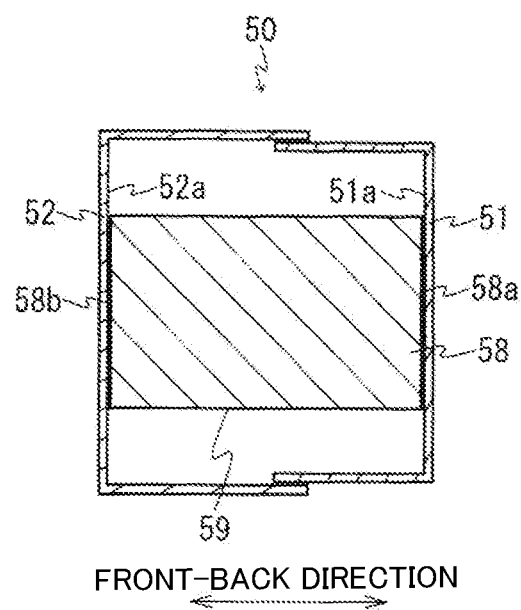
FIG. 5 is a cross-sectional view taken along the line B-B of FIG. 2.

FIG. 2 is a schematic view for explaining a configuration of the front underrun protection 5. FIG. 3 is a schematic view for explaining an internal configuration of a main body 50. FIG. 4 is a cross-sectional view taken along the line A-A of FIG. 2. FIG. 5 is a cross-sectional view taken along the line B-B of FIG. 2. In FIG. 3, a second panel member 52 is omitted for convenience of explanation.

The front underrun protection 5 is arranged below the side frames 2a. As shown in FIG. 2, the front underrun protection 5 includes the main body 50 and a connecting part 60.

The main body 50 serves as a frame of the front underrun protection 5, and its longitudinal direction is along the width direction of the vehicle. The main body 50 is hollow in shape. Specifically, as shown in FIG. 4, the main body 50 is configured such that a first panel member 51 and a second panel member 52 each having a U-shaped cross section face each other. The first panel member 51 is positioned at the back in a front-back direction, and the second panel member 52 is positioned at the front in the front-back direction.

The connecting part 60 is a portion connected to the vehicle body frame 2. The connecting part 60 is positioned between the main body 50 and the vehicle body frame 2 in the vertical direction. The connecting part 60 is positioned below the pair of side frames 2a, and is fixed to the side frames 2a by a fastening member. The connecting part 60 is connected to the first panel member 51 of the main body 50.

Next, the internal configuration of the main body 50 will be described.

As shown in FIG. 3, the main body 50 includes a reinforcement 55 and a bracket 57.

The reinforcement 55 has a function of reinforcing the main body 50. As shown in FIG. 3, the reinforcement 55 is provided at two locations on the main body 50. The two reinforcements 55 are provided along the longitudinal direction of the main body 50 (the front underrun protection 5).

Here, the reinforcement 55 is provided at a position corresponding to the connecting part 60 (specifically, below the connecting part 60). As shown in FIG. 4, the reinforcement 55 is formed in a U shape. The reinforcement 55 is fixed to a bottom surface 51a of the first panel member 51. Further, the reinforcement 55 is in contact with a bottom surface 52a of the second panel member 52.

The bracket 57 is provided farther toward a distal end in the longitudinal direction than the connecting part 60, inside the main body 50. For example, the bracket 57 is provided at the position of the B-B-line cross section of FIG. 2. The position of the B-B-line cross section is a position separated outward by a predetermined distance from a front wheel 4 (see FIG. 1) in the width direction of the vehicle 1.

In the present embodiment, brackets 57 are provided to a first end and a second end in the longitudinal direction, respectively. The brackets 57 function as reinforcing panels at both end portions in the longitudinal direction. It should be noted that instead of the brackets 57, a measure of extending the reinforcement 55 to the end portions in the longitudinal direction can be considered, but in this case, extending the reinforcement 55 increases the weight of the front underrun protection 5.

Since the bracket 57 provided to the first end in the longitudinal direction and the bracket 57 provided to the second end in the longitudinal direction have the same shape, hereinafter the bracket 57 provided to the first end in the longitudinal direction will be described as an example.

Here, the bracket 57 is an L-shaped bracket. The bracket 57 is fixed to the bottom surface 51a of the first panel member 51 by welding. The bracket 57 is positioned farther toward a distal end in the longitudinal direction than the reinforcement 55, inside the main body 50. As shown in FIG. 3, the bracket 57 includes a vertical panel 58 and a horizontal panel 59. Here, the vertical panel 58 and the horizontal panel 59 have the same thickness.

As shown in FIG. 3, the vertical panel 58 is disposed along the vertical direction. Specifically, the vertical panel 58 is disposed in the form of a flat plate along the vertical direction. The length of the vertical panel 58 in the vertical direction is larger than the length of the reinforcement 55 in the vertical direction. By providing the vertical panel 58, it is possible to prevent deformation of end portions of the main body 50 in the vertical direction when a load is applied to the end portions of the main body 50.

The horizontal panel 59 is connected to the lower end of the vertical panel 58. That is, the horizontal panel 59 is positioned at the lower end in the main body 50. Due to this, even if a load is applied to the end portion of the main body 50, the lower end of the end portion of the main body 50 will not be easily crushed. Therefore, the end portion of the main body 50 can be bent rearward due to the load applied thereto, but it is possible to prevent the end portion of the main body 50 from being bent downward. In other words, it is possible to prevent the end portion of the main body 50 from being deformed such that it turns with respect to the connecting part 60. As a result, it is possible to reduce a deformation amount of the end portion due to the load.

As shown in FIG. 3, the horizontal panel 59 is disposed along the longitudinal direction of the main body 50. Specifically, the horizontal panel 59 is disposed in the form of a flat plate along the longitudinal direction. The length of the horizontal panel 59 in the longitudinal direction is smaller than the length of the reinforcement 55 in the longitudinal direction. The horizontal panel 59 extends from the lower end of the vertical panel 58 toward the center in the longitudinal direction. However, the present disclosure is not limited to this, and the horizontal panel 59 may extend from the lower end of the vertical panel 58 toward the end in the longitudinal direction.

Since the horizontal panel 59 is not provided to the upper end of the vertical panel 58, it is possible to prevent the weight of the bracket 57 from increasing. It should be noted that if the horizontal panel 59 is not provided to the upper end of the vertical panel 58, when a load is applied to the end portion of the main body 50, a crushing amount of the upper end of the end portion becomes larger than a crushing amount of the lower end of the end portion, but deformation such that the end portion turns is not affected.

As shown in FIG. 5, the vertical panel 58 and the horizontal panel 59 are sandwiched between the first panel member 51 and the second panel member 52. Specifically, the vertical panel 58 and the horizontal panel 59 are in contact with the bottom surface 51a of the first panel member 51 and the bottom surface 52a of the second panel member 52.

As shown in FIG. 3, the bracket 57 is disposed in a wider range in the vertical direction than the reinforcement 55. Specifically, the upper end of the vertical panel 58 is positioned above the reinforcement 55 in the vertical direction. Further, the horizontal panel 59 is positioned below the reinforcement 55 in the vertical direction. Therefore, even if a load is applied, the bottom surface 51a of the first panel member 51 and the bottom surface 52a of the second panel member 52 of the main body 50 can easily stay parallel to each other. As a result, it is possible to prevent the end portion of the main body 50 from being deformed in a manner to be bent downward.

Effect of the Present Embodiment

The front underrun protection 5 of the above-described embodiment includes the bracket 57 provided to an end in the longitudinal direction, inside the main body 50. The bracket 57 includes the vertical panel 58 disposed along the vertical direction, and the horizontal panel 59 connected to the lower end of the vertical panel 58 and disposed along the longitudinal direction.

Providing the above-described L-shaped bracket 57 makes it possible to reinforce the end portions in the longitudinal direction of the front underrun protection 5. Thus, even if a load is applied to the longitudinal-direction end portions, it is possible to prevent deformation that would cause the end portion to turn (i.e., that would cause the end portion to be deformed rearward and downward). As a result, it is possible to reduce a deformation amount of the end portion of the front underrun protection 5 caused by the load.

Although the configuration of the front underrun protection 5 having the L-shaped bracket 57 inside has been described above, the rear underrun protection 6 may have a similar configuration. That is, the rear underrun protection 6 may also have the L-shaped bracket 57 at the end portion in the longitudinal direction inside. Due to this, it is possible to prevent deformation of the end portion of the rear underrun protection 6.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An underrun protection mounted on a vehicle body frame of a vehicle, the underrun protection comprising:
   a main body that is hollow in shape and has a longitudinal direction along a width direction of the vehicle;
   a connecting part connected to the vehicle body frame; and
   a bracket provided inside the main body, an entirety of the bracket is away from the connecting part on an end in the longitudinal direction,
   wherein the bracket includes:
      a vertical panel disposed along a vertical direction; and
      a horizontal panel connected to a lower end of the vertical panel and disposed along the longitudinal direction.

2. The underrun protection according to claim 1, wherein the main body is configured such that a first panel member and a second panel member, each having a U-shaped cross section, face each other, and
   the vertical panel and the horizontal panel are sandwiched between the first panel member and the second panel member.

3. The underrun protection according to claim 2, wherein the vertical panel and the horizontal panel are in contact with both a bottom surface of the first panel member and a bottom surface of the second panel member.

4. The underrun protection according to claim 1, further comprising:
   a reinforcement that is provided to a center of the main body with respect to the bracket along the longitudinal direction and is formed in a U shape, wherein
   the horizontal panel is positioned below the reinforcement in the vertical direction.

5. The underrun protection according to claim 4, wherein an upper end of the vertical panel is positioned above the reinforcement in the vertical direction.

6. The underrun protection according to claim 5, wherein the horizontal panel is positioned below the reinforcement in the vertical direction.

7. The underrun protection according to claim 4, wherein the connecting part is positioned between the main body and the vehicle body frame in the vertical direction, and
   the reinforcement is provided below the connecting part.

8. The underrun protection according to claim 4, wherein a length of the vertical panel in the vertical direction is larger than a length of the reinforcement in the vertical direction, and
   a length of the horizontal panel in the longitudinal direction is smaller than the length of the reinforcement in the longitudinal direction.

9. The underrun protection according to claim 1, wherein the vertical panel is disposed in a form of a flat plate along the vertical direction, and
   the horizontal panel is disposed in a form of a flat plate along the longitudinal direction.

10. The underrun protection according to claim 1, wherein the horizontal panel extends from the lower end of the vertical panel toward a center of the main body in the longitudinal direction.

\* \* \* \* \*